April 9, 1963 R. C. COWDEN 3,085,246

MAGNETIC RECORDING METHOD

Filed Nov. 26, 1958 2 Sheets-Sheet 1

INVENTOR.
RICHARD C. COWDEN
BY Baylor G. Riddell
ATTORNEY

April 9, 1963 R. C. COWDEN 3,085,246

MAGNETIC RECORDING METHOD

Filed Nov. 26, 1958 2 Sheets-Sheet 2

3,085,246
Patented Apr. 9, 1963

1

3,085,246

MAGNETIC RECORDING METHOD

Richard C. Cowden, Los Gatos, Calif., assignor to International Business Machines Corporation, New York, N.Y., a corporation of New York Filed Nov. 26, 1958, Ser. No. 776,546
1 Claim. (Cl. 346—74)

This invention relates to magnetic recording and more particularly to a method and means for magnetic recording of discrete data pulses wherein a continuous magnetic flux is applied to a moving magnetic recording medium, and momentarily discontinued in response to electrical data pulses to record such pulses on the medium.

In the prior art of discrete pulse recording, probably the most popular method of recording digital information on a magnetic surface has been to apply a pulse of current in one direction through a magnetic recording head to record a binary digit, for example a "0" and to apply a pulse in the opposite direction for a "1." This method has been called the "return-to-zero" or RZ method because the current returns to zero between each digit or "bit" of information. There are two minor variations of this RZ recording method although they are not often used. Both involve the use of pulses for the storage of 1's and no pulses for 0's. In one variation the magnetic surface is initially in the demagnetized state and in the other variation the surface is initially magnetized to saturation. The output signals are approximately the same in the two cases. The difference in the merits of the two variations is mostly a matter of the relative convenience of alternating-current erasing for leaving the material demagnetized or of direct-current "erasing" for leaving the material in a condition of magnetic saturation. These variations have the advantage of simplicity, but have the disadvantage that old information is not automatically erased when new information is recorded at the same place.

The disadvantageous nature of this feature is best illustrated by example. Thus, if the presence of a pulse stands for a binary "1" and no pulse for a "0" and if the binary number 1011 has been recorded at a discrete location on a magnetic surface, the surface magnetization of the location will correspond to the bits recorded, i.e., (from right to left for 1011) magnetized, magnetized, not magnetized, magnetized. Subsequently, to record a different number at the same location, such as the number 0111, the first and second order (righthand) digits must be left in their former (magnetized) condition while the third and fourth order digits (leftmost) must be reversed. As a result, that portion of the surface which represents the third order digit, "0," and which was not magnetized before, must now be magnetized to record a "1." However, for the fourth order digit, demagnetization must be effected to change the previously recorded "1" to a "0." Obviously, the demagnetization of one discrete bit i.e., the fourth order digit, would be even more difficult to accomplish than magnetization (as exemplified by the change in the third order digit above). However, rather than attempt to "single out" and change each discrete bit or digit separately, the most practicable method to effect this has been to erase the first number in its entirety using one of the two methods above, namely, either A.C. erase or reverse saturation, followed by recordation of the new number.

2

The necessity for this additional intermediate erase step with its attendant additional structure explains at least in part why these two variations of the RZ method are not often used, and why the method first described, i.e., the method of magnetic recording wherein the resulting recorded magnetic flux of each bit is of one of two polarities according to whether a binary "1" or "0" has been recorded, is more usually used.

The present invention, however, eliminates the intermediate erase step required in the RZ variations described above without the necessity of magnetizing the recording surface in two opposite directions, as in the more popular RZ method first described. Accordingly, in the method of the present invention, a magnetic surface is continuously being magnetized in one direction (to saturation for best results, i.e., "erased") until a pulse representing a digit value, for example a "1" in the binary system, is to be recorded. At such times the "erasing" is merely discontinued, thereby leaving a discrete magnetic spot or "bit" on the magnetic surface which can be easily identified or sensed by an appropriate reading head.

Therefore, it is an object of the present invention to provide a simplified method of magnetic recording of data on a magnetic surface, wherein a discrete identifiable variation of recorded flux is achieved by merely discontinuing or interrupting the otherwise continuous recording thereon of a flux of a predetermined polarity.

The technique of the prior art which required all the "1's" and "0's" to be recorded by magnetizing discrete areas in either of two opposite directions, or polarities, has been accomplished in the past by employing at least two coils on the recording head, one for recording "1's" and the other for recording "0's." More particularly, in the prior approach, one coil is wrapped about a magnetic core piece having a recording gap therein so that energizing the coil with a D.C. current produces a magnetic flux in one direction at the gap, while the other coil is wrapped in a reverse direction to produce a flux at the gap directly opposite to that of the former. In practice the two coils are joined as one, and a lead is connected at the junction to form what is popularly known as a "center-tap" coil. However, from the foregoing it will be understood that such an arrangement functions as two separate coils.

In the present invention, however, a recording circuit is provided using a "writing" coil mounted on the core piece of the head, together with means for providing a continuous D.C. current through that coil and additional circuitry responsive to electrical data pulses to be recorded for interrupting (i.e., temporarily discontinuing) the D.C. current through the coil. This structure achieves a sufficient enough change in the recorded flux during each current interruption to provide identifiable discrete recorded magnetic data bits, when "read" with conventional reading heads known to the art. Hence, by elimination of one of the two previously required recording head coils and associated circuitry, a considerably simplified recording apparatus has been achieved.

It is, therefore, another object of this invention to provide a simplified recording circuit for recording discrete intelligence pulses on a moving magnetic medium including a recording head having a "write" coil which performs both the erase and record functions.

It is a further object of this invention to provide a simplified means for recording discrete intelligence pulses on a moving magnetic medium including a recording head having only a single "write" coil and means for interrupting a continuous unidirectional current therethrough to record an identifiable change in flux upon the medium.

Other objects of the invention will be pointed out in the following description and claim and illustrated in the accompanying drawings which disclose, by way of example, the principle of the invention and the best mode which has been contemplated of applying that principle.

Figure 1:
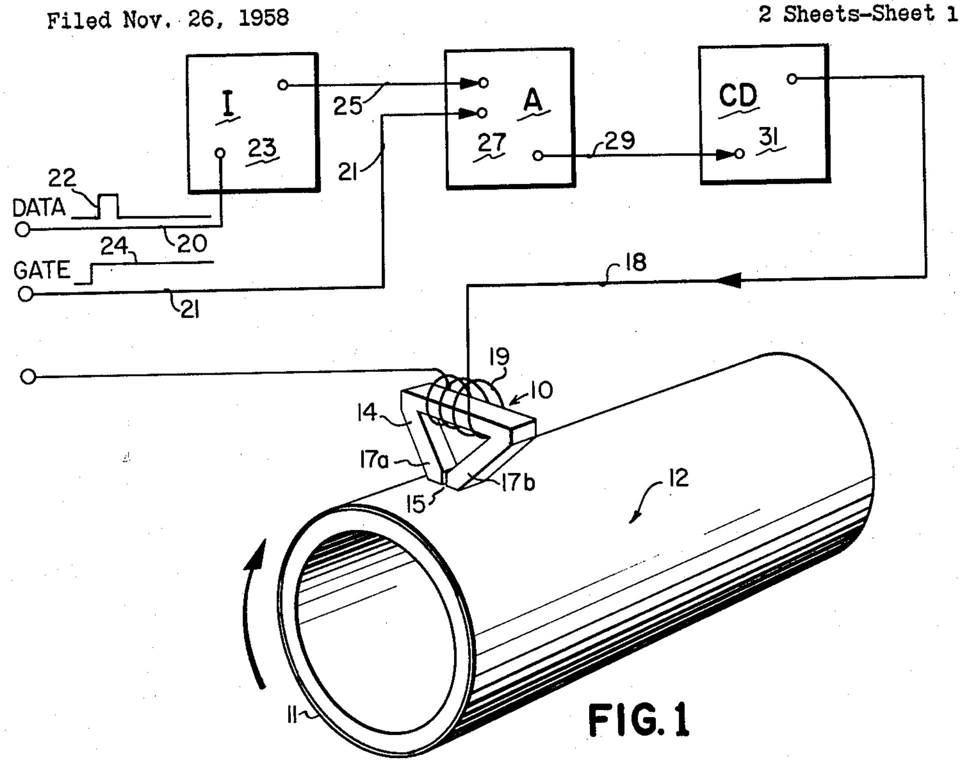
FIG. 1 is a schematic diagram of a suitable circuit for recording discrete data pulses on a rotatable drum having a magnetizable peripheral surface.
Figure 4:
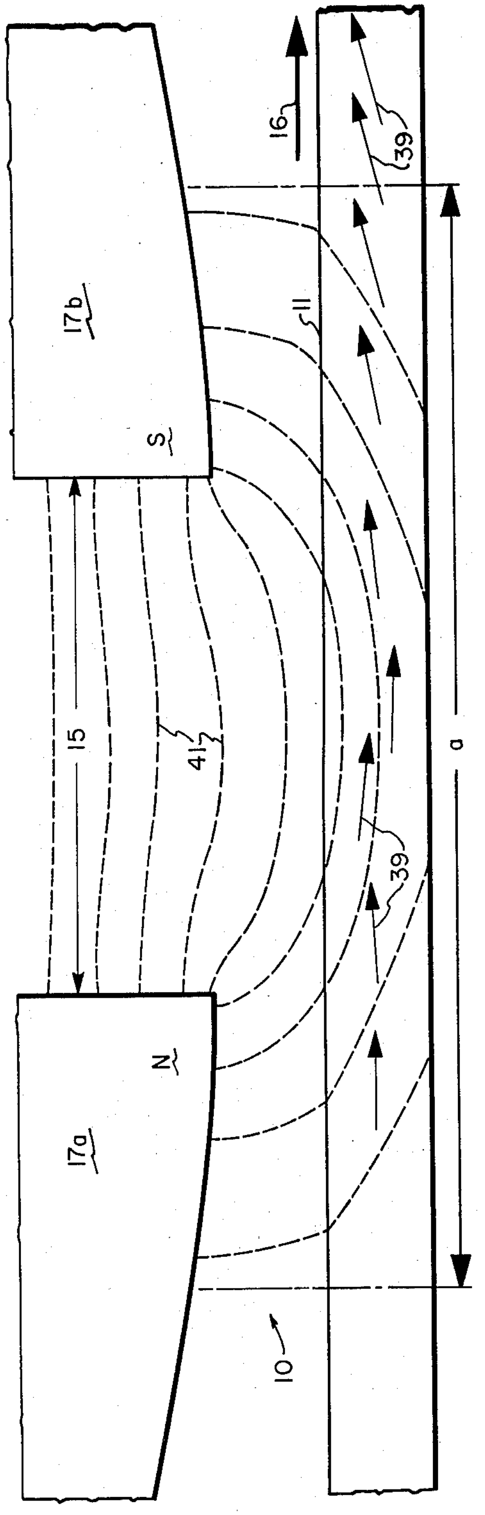
Figure 3:
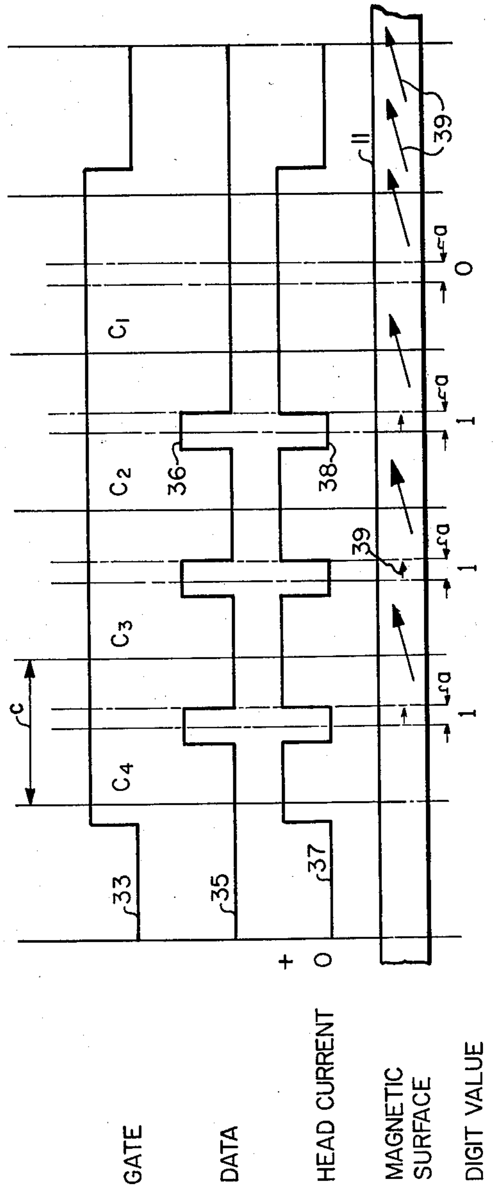
FIG. 3 shows by means of pulse timing curves the relationship of the recorded flux condition on a magnetic surface representing the four digit binary number 1110 with respect to the occurrence of associated recording pulses as shown in the curves.

FIG. 4 is a greatly enlarged schematic representation of the portion of the magnetic surface 11 in FIG. 1, and specifically shown the portion of FIG. 3 designated by the letter "*a*." FIG. 4 is included for purposes of suggesting one possible explanation of the discovered phenomenon of the present invention in terms of what is believed to be occurring within a magnetic recording surface during the passage thereover of an energized recording magnet. To conserve space, the vertical dimension has been merely doubled over that of FIG. 3, while the horizontal dimension has been increased many times.

Figures 2, 5:
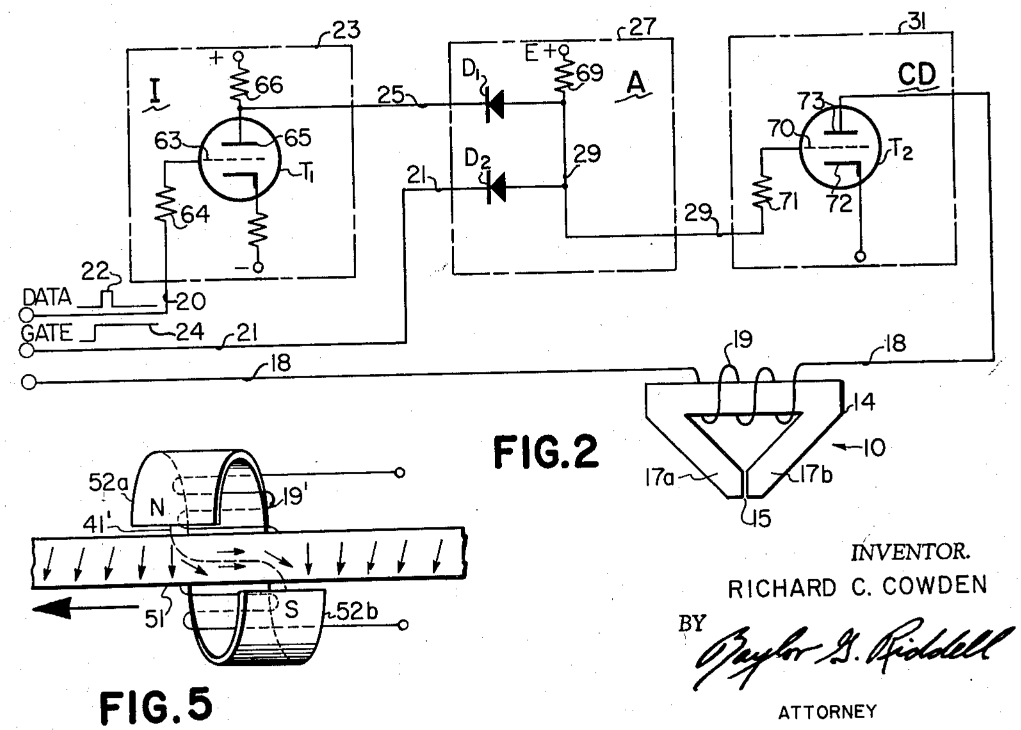
FIG. 2 is the actual circuit represented by FIG. 1.

FIG. 5 shows an alternative embodiment.

Referring to the drawings and particularly to FIG. 1, the novel electrical circuit and apparatus for practicing the method of the invention is schematically thereshown. The circuit in general controls a recording transducer or head 10 so that head 10 is continuously magnetizing a suitable magnetic recording surface, such as the surface 11 of a rotatable drum 12, for example, with a flux of one polarity except when a digit is to be recorded. At such times the circuit of the invention interrupts the current to head 10 thereby producing a discrete identifiable variation in the flux recorded on surface 11. Head 10 as shown is substantially of the conventional type known as a "ring" type head. Head 10 includes a highly permeable magnetic core 14 which is disposed in a substantially closed loop with a very small gap 15 existing between its ends or pole tips 17*a* and 17*b* respectively. An electrical conductor 18 is wrapped around core 14 to form a coil 19 thereon. Energizing coil 19 causes a magnetic flux to circulate through the core (and across its gap) either clockwise or counterclockwise depending upon both the direction of current flow in coil 19 and the direction in which coil 19 has been wound about core 14.

In the circuit of FIG. 1 there is provided a pair of electrical conductors 20 and 21. Conductor 20 supplies discrete binary signals 22 to be recorded by the circuit thereshown. Signals 22 are in the form of electrical voltages at two substantially different levels. The higher level represents a binary digit value of "1" to be recorded and the lower level a "0." The higher voltage will be described as "positive" and the lower "negative" even though the higher voltage might actually have a negative absolute value with respect to ground. The difference or range between the two levels will usually be established so that the lower level is below the cut-off voltage of the associated tube while the upper level is sufficiently above cut-off to provide substantially full conduction. Conductor 20 leads from a source of such discrete binary signals 22 as found for example in digital computers, while conductor 21 leads from a control gate circuit (not shown) which provides a "positive" pulse on conductor 21 when the gate is "up" or "open," and a "negative" pulse when the gate is "down" or "closed." Conductor 20 leads to an inverter circuit 23 having an output conductor 25. Inverter 23 functions to "invert," i.e., proportionately reverse, the potential of input pulses thereto. Thus, an input pulse on conductor 20 representing a digit "1," i.e., a positive pulse, produces a lowering of the potential of the output from inverter 23 on conductor 25. Conductor 25 leads from inverter 23 to a "positive AND" circuit 27 of a type which requires the simultaneous presence of two signals thereat to produce an output pulse. One of the two required inputs for circuit 27 will therefore be supplied from the output of inverter 23. The other input to AND circuit 27, in the form of a sustained positive D.C. voltage level represented by waveform 24, comes from a suitable control gate circuit (not shown) via conductor 21. Thus, positive pulses on conductors 21 and 25 are required to provide an output from AND circuit 27. AND circuit 27 is connected via conductor 29 to a current driver 31 operated by the output from circuit 27. Thus, when the inverter output is negative, current driver 31 will be cut off. Therefore, current driver 31 is cut off whenever a binary "1," a positive pulse, is supplied to inverter circuit 23. Conversely, the lower or "negative" D.C. voltage level, as represented by waveform 22, on conductor 20 will cause head 10 to record a continuous flux of one polarity on surface 11.

The operation of the circuit just described may best be understood by reference to FIG. 3. Since the surface and head move with respect to each other during the recording process, as well as during "reading," a plot of current as a function of time is closely analogous to a plot of the recorded magnetic flux in surface 11 as a function of distance therealong. This relationship is shown using square wave curves in FIG. 3 wherein curve 33 represents the voltage level on conductor 21; curve 35 represents the voltage level on conductor 20; and curve 37 represents the presence or absence of recording current in coil 19 of head 10.

In FIG. 3 the binary number "14" has been recorded on surface 11. The number is comprised of four digits or "bits," each recorded within its own allotted discrete length of surface 11, designated by the dimensional arrow *c*. These discrete distances are herein referred to as "cells," $C_1$–$C_4$. Within each cell is a very short distance, designated by the letter *a* wherein the recorded flux will be varied sufficiently to be identifiable whenever a digit value of "1" is to be recorded. In the absence of a "1" to be recorded, a "0" will be present in the form of an absence of an identifiable change in the recorded flux. Distance *a* represents the distance along surface 11 wherein the recorded magnetic flux is varied by discontinuing current in coil 19, and is illustrated as beginning with the leading edge of each discontinuity in the head current, in the belief that such is probably the case. However, this is a part of the suggested explanatory theory as explained below and is not required to practice the invention. Distance *a* will be referred to for convenience as the "recording distance." The alignment of the magnetic "domains" or elemental bar magnets of the recorded flux in surface 11 is schematically represented by arrows 39 and for convenience the head of each arrow 39 will be considered to be the north magnetic pole of the "domain" or group of "domains" it represents. Thus, in FIG. 3, cell $C_1$ for the first order (righthand) digit value "0" contains no variation in the recorded flux. In cell $C_1$, gate 33 is high and data input 35 is low. Therefore, head current is up (curve 37) and head 10 is continuously recording throughout cell $C_1$. In cell $C_2$ a digit "1" is recorded by the presence on conductor 20 of a positive pulse 36 shown on data curve 35. Since gate 33 is still positive, the head current will be cut off as shown by the negative pulse 38 on curve 37. The moment of cut-off in head 10, designated by recording distance *a*, produces an identifiable variation in the otherwise uniformly recorded flux 39. Pulses are similarly recorded in cells $C_3$ and $C_4$.

Referring to FIG. 4, one suggested theory explaining what may be happening in the magnetic surface 11 is herein submitted for the purpose of making the invention more understandable, although an understanding of this explanatory theory will not be necessary to practice the invention. FIG. 4 shows recording distance *a*, greatly enlarged, as surface 11 passes beneath pole tips 17*a* and 17*b*. Coil 19 is assumed to be carrying a current and hence, head 10 is recording. This condition is shown by the presence of magnetic lines of flux 41, some of which pass between tips 17*a* and 17*b* by way of surface 11, due to the lower reluctance of the longer path. Surface 11 is assumed to be moving to the right in FIG. 4 as shown by arrow 16 with respect to gap 15. Pole tip 17*a* has been arbitrarily designated the north magnetic pole, N, of head 10 and 17*b* the south, S. It is believed that the magnetic "domains" 39 will tend to conform or align themselves to the direction of those flux lines 41 in surface 11 as surface 11 moves through the magnetic influence of gap 15. Thus, "domains" 39 on the right of gap 15, i.e., as they leave its magnetic influence, point generally "north" end upwardly toward the south pole tip 17*b*. Where surface 11 is cyclically arranged, these domains will approach gap 15 from the left, disposed at this same angle. However, when they enter the magnetic influence (recording distance *a*) of tip 17*a*, they will be driven into conformity with lines 41 by the repelling action of the north pole tip 17*a* acting upon the nearer north end of "domains" 39. In this condition, the removal of the magnetic field, by means of discontinuing the current in coil 19, will leave those "domains" 39 that are within recording distance *a* in the transition stage of alignment as shown.

Finally, referring to FIG. 2, the complete circuit represented by the blocks in FIG. 1 has been disclosed and will now be described in detail. The blocks in FIG. 1 have been retained in phantom lines in FIG. 2 to more easily correlate the two figures. Conductor 20 which supplies incoming data pulses 22 to inverter 23 leads to the grid 63 of a triode, $T_1$, through a suitable grid resistor 64. The plate 65 of tube $T_1$, appropriately biased positive through a suitable plate resistor 66, provides the output from inverter 23 and is connected via conductor 25 to a diode rectifier, $D_1$ in AND circuit 27. Rectifier $D_1$ is poled to pass electrons from left to right as shown. Conductor 21, supplying suitable gating pulses 24, is connected to a second diode rectifier, $D_2$ in AND circuit 27 poled in the same direction as rectifier $D_1$. Rectifiers $D_1$ and $D_2$ lead to a common conductor 29. Conductor 29 is connected through a load resistor 69 to a suitably supply voltage E+. Supply voltage E+ is selected so as to be more positive than either of the two signal potentials entering on conductors 21 and 25. Consequently, a coincidence of positive pulses on both conductors 21 and 25 will be required to raise the potential on conductor 29. Conductor 29 leads to the grid 70 of another triode $T_2$ via a suitable grid resistor 71. The voltage drop across resistor 69 is such that tube $T_2$ is normally biased below cutoff except when the potential on conductor 29 goes positive responsive to the coincidence of positive pulses on conductors 21 and 25. At such times tube $T_2$ will be driven into conduction and electrons will flow from its cathode 72 to its plate 73. The plate 73 of tube $T_2$ is in turn connected via conductor 18 to coil 19 of head 10 and thence to a suitable plate supply source (not shown) as desired.

In operation, grid 63 normally maintains tube $T_1$ below cut-off, thereby keeping the potential of plate 65 at its upper level. With the gating pulse 24 also at its upper level, the potential on conductor 29 is raised so as to drive grid 70 sufficiently high to cause tube $T_2$ to go into conduction, thereby generating a D.C. current in coil 19 and a magnetic flux in head 10. So long as the current exists in coil 19 the magnetic flux will continue to circulate in head 10 in one direction, i.e., causing the flux to leave one of the pole tips 17 and pass into the other pole tip without interruption or reversal of this sequence. In this sense the flux may be considered to be "continuous" and of "one polarity," although it will be at once obvious by referring to the domain alignment within recording distance *a* that various orientations thereof may occur, the number and variety thereof being actually irrelevant so long as an identifiable change in domain alignment does occur. On the other hand, when a data pulse to be recorded is received on conductor 20, in the form of a positive increase in the voltage impressed thereon, the potential of grid 63 will be raised while the potential on plate 65 will be lowered thereby dropping the potential on conductor 29 below the cut-off voltage of tube $T_2$, assuming, of course, that gating pulse 24 remains high. In this condition no current will flow in tube $T_2$ and likewise in coil 19 of head 10. Thus, the domain alignment immediately beneath head 10 at the moment the current in coil 19 ceases will be left "as is" to represent an identifiable discrete data bit on surface 11.

Although head 10 as shown is of the "ring" type, the invention contemplates the use of any suitable magnetizing means wherein the recorded flux alignment is substantially varied enough to be identifiable during the time it is subjected to such magnetizing means. For example, it is not beyond the scope of this invention to pass a magnetic tape 51 between two longitudinally displaced pole tips 52*a* and 52*b* of opposite polarity substantially as shown in FIG. 5.

Further, the substantially parallel application of flux to the surface need not necessarily be the only manner in which a flux can be applied to produce an identifiable flux variation in the surface. The important thing is that the domains are in a transition stage of alignment as the surface moves along relative to the recording means so that discontinuing the application of the flux to the surface leaves enough domains out of alignment sufficiently that they can be sensed by a suitable "reading" head.

In the foregoing description the term "substantially parallel" has been used to mean that in the domain vectors (e.g. arrows 39) recorded in the magnetic surface, exclusive of those in the recording distance *a*, the vectorial component parallel to surface 11 is greater than that normal to surface 11.

While there have been shown and described and pointed out the fundamental novel features of the invention as applied to the preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

A system for magnetically recording binary information in terms of directions of magnetization which are less than 90 degrees apart comprising:

a single magnetic core including a pair of spaced apart pole tips defining a gap, a magnetic recording surface whose incremental areas have random directions of magnetization, said surface being disposed in recording relationship with said gap and adapted for movement relative thereto, a winding disposed on said core adapted when energized with current in one direction to cause flux to flow in a closed path from one pole tip to the other around said core and through said recording surface, means for energizing said winding with unidirectional current in response to information of one binary sense to cause incremental areas of said recording surface passing under the trailing pole tip to be magnetized in a first direction substantially parallel to the direction of said flux path in the area immediately adjacent said recording surface and said trailing pole tip, and means for interrupting said current for a period of time less than the time required for a point on said surface to pass from said leading pole tip to said trailing pole tip in response to information of the other binary sense to prevent the direction of magnetization of an incremental area established by the leading pole tip from being affected by said trailing pole tip to record said binary information in terms of a transition from said one direction of magnetization to another direction of magnetization, the difference between said directions of magnetization being less than 90 degrees.

References Cited in the file of this patent

UNITED STATES PATENTS

| | | |
|---|---|---|
| 2,764,463 | Lubkin et al. | Sept. 25, 1956 |
| 2,824,776 | Elovic et al. | Feb. 25, 1958 |
| 2,844,434 | Beard | July 22, 1958 |
| 2,856,256 | Carman et al. | Oct. 14, 1958 |
| 2,862,199 | Scott | Nov. 25, 1958 |
| 2,894,796 | Reynolds | July 14, 1959 |

FOREIGN PATENTS

| | | |
|---|---|---|
| 763,869 | Great Britain | Dec. 19, 1956 |
| 769,727 | Great Britain | Mar. 13, 1957 |
| 776,401 | Great Britain | June 5, 1957 |